United States Patent

Suhara

[11] Patent Number: 5,834,766
[45] Date of Patent: Nov. 10, 1998

[54] MULTI-BEAM SCANNING APPARATUS AND MULTI-BEAM DETECTION METHOD FOR THE SAME

[75] Inventor: Hiroyuki Suhara, Kanagawa, Japan

[73] Assignee: Ricoh Company, Ltd., Tokyo, Japan

[21] Appl. No.: 901,256

[22] Filed: Jul. 28, 1997

[30] Foreign Application Priority Data

Jul. 29, 1996 [JP] Japan .................................. 8-199212

[51] Int. Cl.⁶ ........................................................ H01J 3/14
[52] U.S. Cl. ...................... 250/234; 250/216; 359/204; 347/243
[58] Field of Search ..................................... 250/234, 235, 250/236, 216, 225; 369/44.11; 359/204; 347/243, 233, 236

[56] References Cited

U.S. PATENT DOCUMENTS 5,017,768  5/1991  Takagi .................................. 250/201.5

FOREIGN PATENT DOCUMENTS 6-344592  12/1991  Japan .
7-72399   3/1995   Japan .

*Primary Examiner*—Que Le
*Attorney, Agent, or Firm*—Oblon, Spivak, McClelland, Maier & Neustadt, P.C.

[57] ABSTRACT

A two-beam detection method causes two beams to differ in light intensity and converging the two beams to enter a common photosensitive element, a photoreception surface of the photosensitive element being configured such that the two beams differ in time required to pass the photoreception surface, processes an output from the photosensitive element using a plurality of threshold levels so as to obtain rectangular signals, one of the rectangular signals obtained using one of the plurality of threshold levels being designated as a detection signal for one of the two beams, and performs a predetermined calculation on the rectangular signals so as to obtain a detection signal for the other of the two beams.

29 Claims, 10 Drawing Sheets

FIG.IB
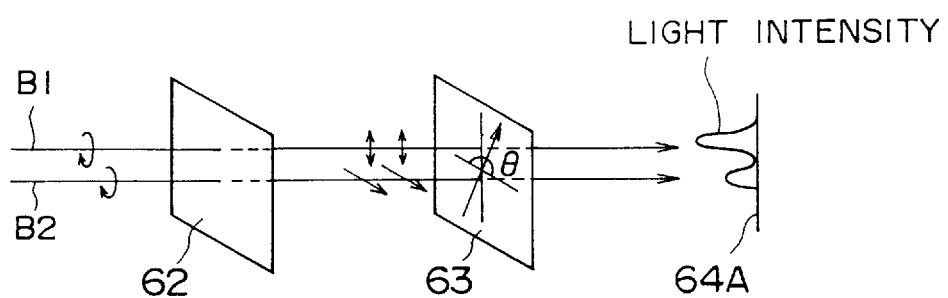
FIG.IC
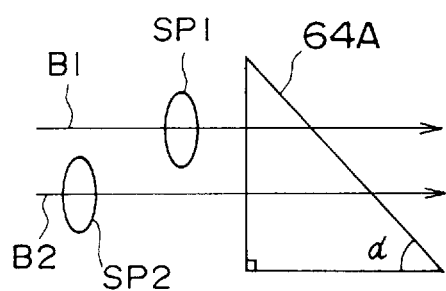

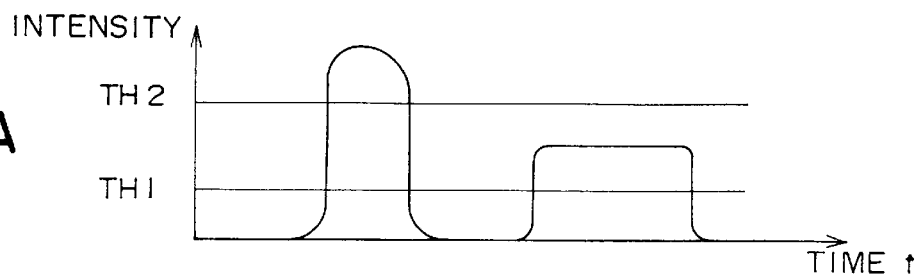
FIG. 2A
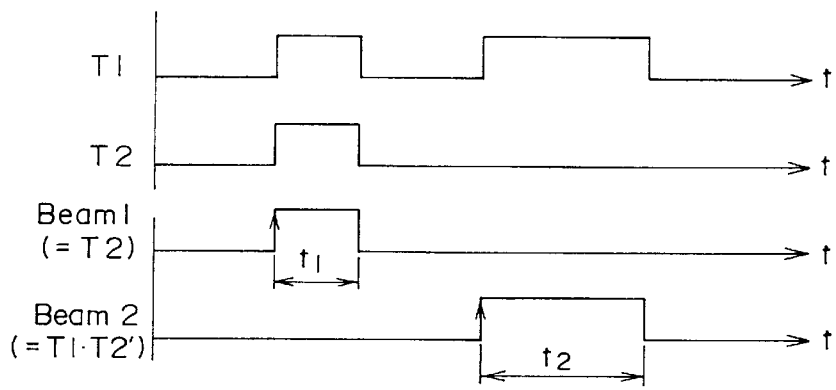
FIG. 2B
FIG. 2C
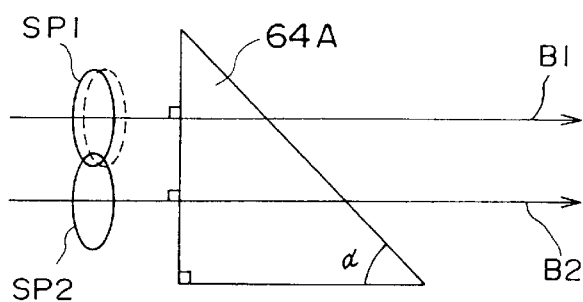
FIG. 3

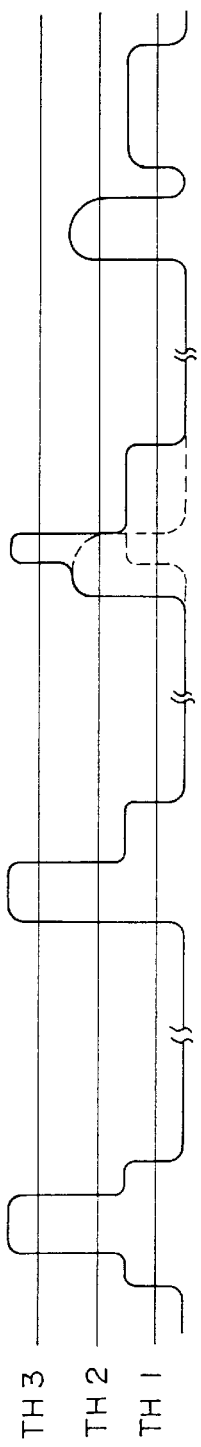
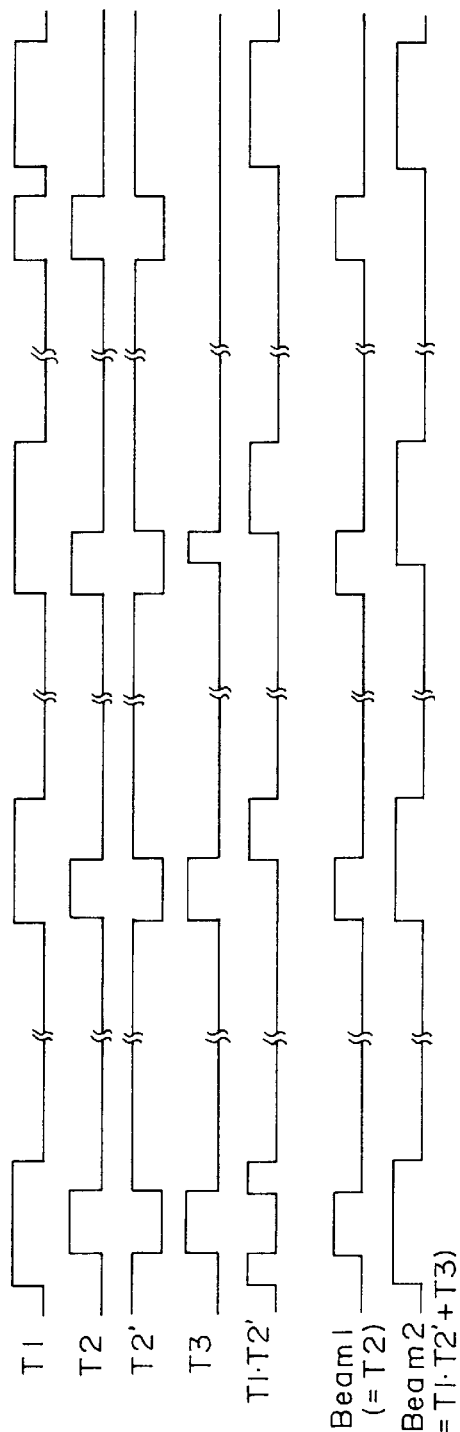
FIG. 4A
FIG. 4B
FIG. 4C

MULTI-BEAM SCANNING APPARATUS AND MULTI-BEAM DETECTION METHOD FOR THE SAME

BACKGROUND OF THE INVENTION

1. Field of the Invention

The present invention generally relates to multi-beam scanning apparatuses and multi-beam detection methods for the same, and, more particularly, to a multi-beam scanning apparatus and a multi-beam detection method in which a plurality of light beams directed to a scanned surface are independently detected while a plurality of light sources are being turned on.

2. Description of the Related Art

An optical scanning apparatus operates such that a light beam having its intensity modulated in accordance with an image signal is deflected so as to scan a scanned surface. Applications of an optical scanning apparatus in the form of a digital copier, an optical printer and the like are widely known. Recently, multi-beam optical scanning apparatuses which use a plurality of beams to simultaneously scan the scanned surface are being developed. Of these, two-beam optical scanning apparatuses are most commonly put to practical use.

A two-beam optical scanning apparatus simultaneously scans a scanned surface with two light spots that are not accurately aligned in the sub-scanning direction (even if an accurate alignment is attempted, the resulting optical spots may be misaligned due to mechanical oscillation or the like occurring in the apparatus; and in some cases, two optical spots are intentionally displaced from each other in the main-scanning direction). For this reason, it is necessary to independently detect two light beams for simultaneously scanning the scanned surface for successful synchronization of two light beams at the start of scanning. Various methods are known to detect two light beams (for example, Japanese Laid-Open Patent Applications No. 6-344592 and No. 7-72399).

Generally, each of two light sources used in a two-beam optical scanning apparatus is embodied by a semiconductor laser that emits a linearly polarized beam. When the linearly polarized beam is deflected by a commonly used polygon mirror (beam deflector), so-called shading occurs. More specifically, as the reflecting angle varies depending on the deflecting and reflecting surface, the reflectivity varies. This results in a variation in the light intensity of a beam spot depending on the height of the beam spot. Shading is usually corrected by transforming the light beam from the semiconductor laser into a circularly polarized beam by causing it to pass through a quarter-wave plate.

Japanese Laid-Open Patent Application No. 6-344592 does not provide for shading correction. If shading correction is taken into account, the invention of Japanese Laid-Open Patent Application No. 6-344592 fails to detect two light beams independently.

Japanese Laid-Open Patent Application No. 7-72399 discloses a method for detecting two light beams while at the same providing for shading correction. However, detection of two light beams according to Japanese Laid-Open Patent Application No. 7-72399 is complicated because it requires a state in which only one of the light sources is turned on and a state in which both light sources are turned on.

The problem described above is not limited to two-beam scanning apparatuses but is inherent in any multi-beam scanning apparatus of the related art.

SUMMARY OF THE INVENTION

Accordingly, it is an object of the present invention to provide a multi-beam scanning apparatus and a multi-beam detection method for the same in which the aforementioned problem is eliminated.

Another and more specific object of the present invention is to provide a multi-beam scanning apparatus and a multi-beam detection method for the same in which multiple light beams directed to a scanned surface are independently detected while multiple light sources are being turned on.

The aforementioned objects can be achieved by a two-beam detection method for separating two beams directed to a scanned surface from each other and detecting the two beams independently, for use in a two-beam scanning apparatus in which light beams from two independent light sources are reflected by a deflecting and reflecting surface of a common beam deflector and the deflected light beams are converged by a common scanning image-forming optic to form two beam spots producing two scan lines for scanning the scanned surface simultaneously, the two-beam detection method comprising the steps of: causing the two beams to differ in light intensity and converging the two beams to enter a common photosensitive element, a photoreception surface of the photosensitive element being configured such that the two beams differ in time required to pass the photoreception surface; processing an output from the photosensitive element using a plurality of threshold levels so as to obtain rectangular signals, one of the rectangular signals obtained using one of the plurality of threshold levels being designated as a detection signal for one of the two beams; and performing a predetermined calculation on the rectangular signals so as to obtain a detection signal for the other of the two beams.

The aforementioned objects can also be achieved by a two-beam detection method for separating two beams directed to a scanned surface from each other and detecting the two beams independently, for use in a two-beam scanning apparatus in which light beams from two independent semiconductor lasers are transformed by a first common quarter-wave plate into beams circularly polarized in opposite directions and are reflected by a deflecting and reflecting surface of a common beam deflector and the deflected light beams are converged by a common scanning image-forming optic to form two beam spots producing two scan lines for scanning the scanned surface simultaneously, the two-beam detection method comprising the steps of: causing the two beams directed to the scanned surface to enter a polarizing beam splitter via a second common quarter-wave plate so as to separate the two beams from each other; and causing the separated beams to enter respective photosensitive elements so as to generate a detection signal for each of the two beams.

According to the two-beam detection method of the present invention, it is possible to detect two beams independently while the light sources are being turned. Two-beam detection can be performed irrespective of whether shading correction is performed.

The aforementioned objects can also be achieved by a two-beam scanning apparatus for running two scan lines simultaneously on a scanned surface, by transforming two beams from two independent semiconductor lasers into beams circularly polarized in opposite directions by a first common quarter-wave plate, reflecting the circularly-polarized beams by a deflecting and reflecting surface of a beam deflector, and by converging the deflected beams by a common scanning image-forming optic to form two beam spots for scanning the scanned surface, the two-beam scanning apparatus comprising: common photosensitive element means for receiving the two beams directed to the scanned surface; converging means for converging the two beams on the common photosensitive element; and controlling means for controlling an operation of the two-beam scanning apparatus; the controlling means comprising: light-intensity differentiating means for differentiating light intensity of the two beams incident on the common photosensitive element; signal-generating means for processing an output of the common photosensitive element using a plurality of threshold levels so as to obtain rectangular signals; and operating means for performing a predetermined operation on the rectangular signals obtained by the signal-generating means, wherein the common photosensitive element has a photo-reception surface configured such that a width thereof in a scanning direction of the common photosensitive element increases in a direction perpendicular to the scanning direction.

The aforementioned objects can also be achieved by a two-beam scanning apparatus for running two scan lines simultaneously on a scanned surface, by transforming two beams from two independent semiconductor lasers into beams circularly polarized in opposite directions by a first common quarter-wave plate, reflecting the circularly-polarized beams by a deflecting and reflecting surface of a beam deflector, and by converging the deflected beams by a common scanning image-forming optic to form two beam spots for scanning the scanned surface, the two-beam scanning apparatus comprising: a second common quarter-wave plate for transmitting the two beams directed to the scanned surface; a polarizing beam splitter for separating the two beams transmitted by the second common quarter-wave plate; and two photosensitive elements for respectively receiving the two beams separated by the polarizing beam splitter so as to output detection signals respectively indicating detection of the two beams.

According to the two-beam scanning apparatus of the present invention, it is ensured that two beams are spatially separated so as to be properly detected. Thus, synchronization at the start of scanning can be performed for individual beams, resulting in high-quality two-beam scanning. The operating means may be provided with the function of calculating a separation between the two beams for simultaneous scanning.

The aforementioned objects can also be achieved by a multi-beam detection method for separating a total of n ($\geq 2$) beams directed to a scanned surface from each other and detecting the n beams independently, for use in a multi-beam scanning apparatus in which light beams from a total of n ($\geq 2$) independent light sources are reflected by a deflecting and reflecting surface of a common beam deflector and the deflected light beams are converged by a common scanning image-forming optic to form n beam spots producing n scan lines for scanning the scanned surface simultaneously, the multi-beam detection method comprising the steps of: causing the n beams to differ in light intensity and converging the n beams to enter a common photosensitive element, a photoreception surface of the photosensitive element being configured such that the n beams differ in time required to pass the photoreception surface; processing an output from the photosensitive element using a plurality of threshold levels so as to obtain rectangular signals, one of the rectangular signals obtained using one of the plurality of threshold levels being designated as a detection signal for one of the n beams; and performing predetermined calculations on the rectangular signals so as to obtain detection signals for the other beams.

The aforementioned objects can also be achieved by a multi-beam detection method for separating a total of n ($\geq 3$) beams directed to a scanned surface from each other and detecting the n beams independently, for use in a multi-beam scanning apparatus in which n light beams from two independent semiconductor laser light sources are transformed by a common quarter-wave plate into two sets of beams circularly polarized in opposite directions, one of the two sets of beams being derived from one of the two independent light sources and the other of the two sets of beams being derived from the other of the two independent light sources, at least one of the two independent semiconductor laser light sources being embodied by a semiconductor laser array, and in which the circularly-polarized beams are reflected by a deflecting and reflecting surface of a common beam deflector and the deflected light beams are converged by a common scanning image-forming optic to form n beam spots producing n scan lines for scanning the scanned surface simultaneously, the multi-beam detection method comprising the steps of: causing the n beams directed to the scanned surface to enter a polarizing beam splitter via a second common quarter-wave plate so as to separate the beams into two sets of beams each corresponding to one of the two independent semiconductor laser light sources; causing the two separated sets of beams to enter respective photosensitive elements, a photoreception surface of the photosensitive element for receiving two or more beams being configured such that the beams differ from each other in time required to pass the photoreception surface; processing an output from the photosensitive element for receiving two or more beams, using a plurality of threshold levels so as to obtain rectangular signals, one of the rectangular signals obtained using one of the plurality of threshold levels being designated as a detection signal for one of the n beams; and performing predetermined calculations on the rectangular signals so as to obtain detection signals for the other beams.

According to the multi-beam detection method of the present invention, it is possible to detect two or more beams while a plurality of light-emitting parts are being turned on. Multi-beam detection can be performed irrespective of whether shading correction is performed.

The aforementioned objects can also be achieved by a multi-beam scanning apparatus for running n ($\geq 3$) scan lines simultaneously on a scanned surface, by reflecting n beams from two independent semiconductor laser light sources by a deflecting and reflecting surface of a common beam deflector, and by converging the deflected beams by a common scanning image-forming optic to form n beam spots for scanning the scanned surface, at least one of the two independent semiconductor laser light sources being embodied by a semiconductor laser array, the multi-beam scanning apparatus comprising: common photosensitive element means for receiving the n beams directed to the scanned surface; converging means for converging the n beams on the common photosensitive element; and controlling means for controlling an operation of the multi-beam scanning apparatus; the controlling means comprising: light-intensity differentiating means for differentiating light intensity of the n beams incident on the common photosensitive element; signal-generating means for processing an output of the photosensitive element using a plurality of threshold levels so as to obtain rectangular signals; and operating means for performing predetermined operations on the rectangular signals obtained by the signal-generating means, wherein the common photosensitive element has a photo-reception surface configured such that a width thereof in a scanning direction of the common photosensitive element increases in a direction perpendicular to the scanning direction.

The aforementioned objects can also be achieved by a multi-beam scanning apparatus for running n (≧3) scan lines simultaneously on a scanned surface, by transforming, using a first common quarter-wave plate, n beams from two independent semiconductor laser light sources into two sets of beams circularly polarized in opposite directions, one of the two sets of beams being derived from one of the two independent light sources and the other of the two sets of beams being derived from the other of the two independent light sources, at least one of the two independent semiconductor laser light sources being embodied by a semiconductor laser array, by reflecting the circularly-polarized beams by a deflecting and reflecting surface of a common beam deflector, and by converging the deflected light beams by a common scanning image-forming optic to form n beam spots producing n scan lines for scanning the scanned surface simultaneously, the multi-beam scanning apparatus comprising: a second common quarter-wave plate for transmitting the n beams directed to the scanned surface; a polarizing beam splitter for separating the n beams transmitted by the second common quarter-wave plate into two sets of beams each corresponding to one of the two independent semiconductor laser light sources; two photosensitive elements for receiving respective one of the two sets of separated beams so as to provide outputs used to generate detection signals; and controlling means for controlling an operation of the multi-beam scanning apparatus, the controlling means comprising: light-intensity differentiating means for causing the beams emitted by the semiconductor laser light source for emitting two or more beams, to differ from each other in light intensity; signal-generating means for processing the output of the photosensitive element for receiving two or more beams using a plurality of threshold levels so as to obtain rectangular signals; and operating means for performing predetermined operations on the rectangular signals obtained by the signal-generating means, wherein the photosensitive element for receiving two or more beams has a photoreception surface configured such that the incident beams differ in time required to pass the photoreception surface.

According to the multi-beam scanning apparatus of the present invention, it is ensured that multiple beams are spatially separated so as to be properly detected. Thus, synchronization at the start of scanning can be performed for individual beams, resulting in high-quality multi-beam scanning. The operating means may be provided with the function of calculating a separation between adjacent beams for simultaneous scanning.

BRIEF DESCRIPTION OF THE DRAWINGS

Other objects and further features of the present invention will be apparent from the following detailed description when read in conjunction with the accompanying drawings, in which:

FIG. 1B shows how a light-intensity differentiating means differentiates one beam from the other in light intensity;

FIG. 1C shows how two beams displaced from each other in a scanning direction of a photosensitive element pass a photoreception surface of the photosensitive element;

FIGS. 2A through 2C show how detection signals are obtained from an output of the photosensitive element receiving the two beams in the manner shown in FIG. 1C;

FIG. 3 shows how two beams relatively close to each other in the scanning direction of the photosensitive element pass the photoreception surface of the photosensitive element;

FIGS. 4A through 4C show how detection signals are obtained from an output of the photosensitive element receiving the two beams in the manner shown in FIG. 3;

DESCRIPTION OF THE PREFERRED EMBODIMENTS

Figure 1A:
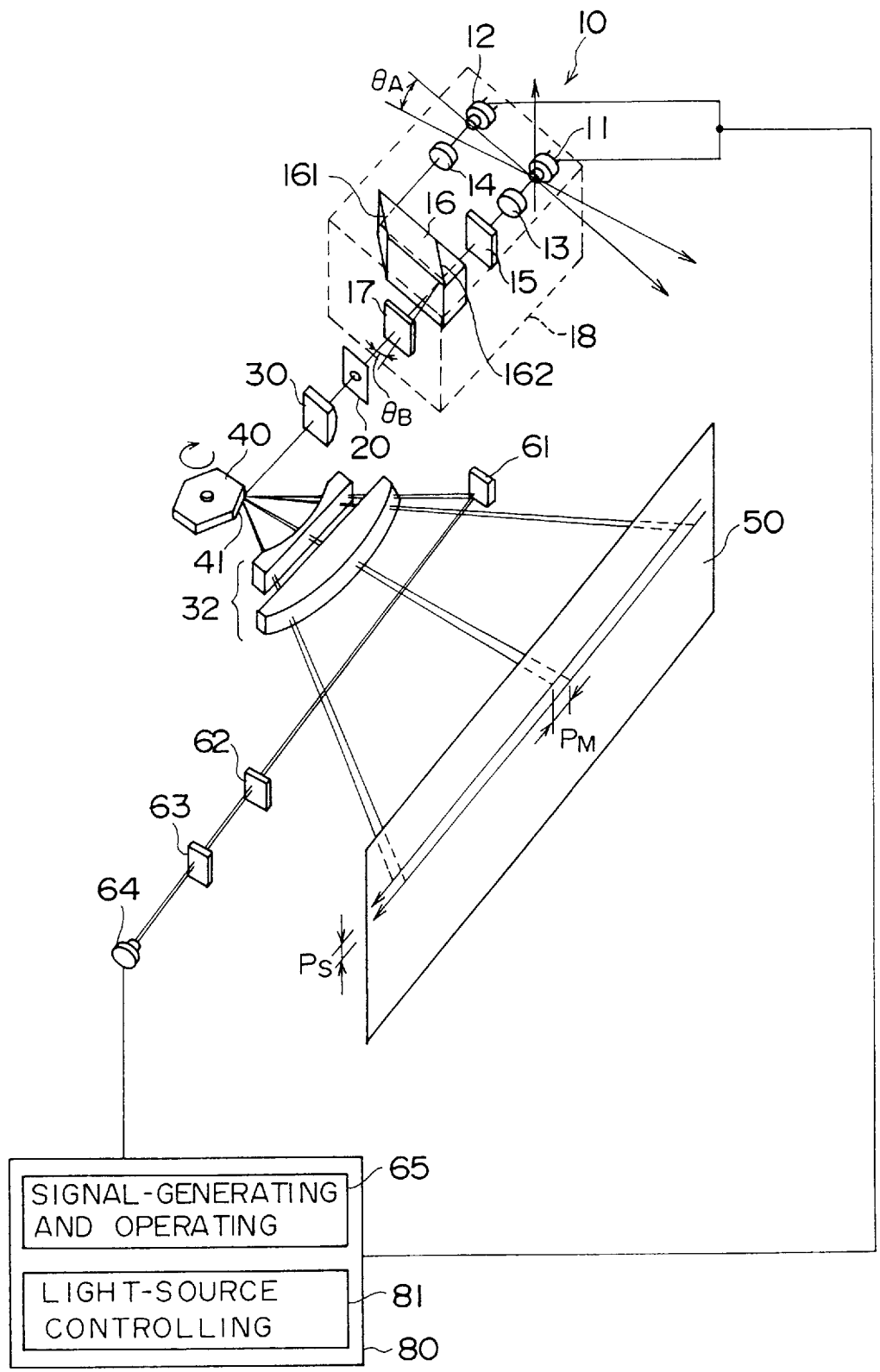
FIG. 1A shows a two-beam scanning apparatus according to a first embodiment of the present invention.

FIG. 1A shows a two-beam scanning apparatus according to a first embodiment of the present invention. Referring to FIG. 1A, a light source 10 emits two parallel light beams for two-beam scanning. The emitted two beams are transmitted through an aperture of an aperture plate 20 provided for beam spot shaping before entering a cylinder lens 30. The cylinder lens 30 converges the two beams only in a direction that corresponds to the sub-scanning (sagittal) direction. The direction in which the cylinder lens 30 converges the two beams matches the sub-scanning direction when the optical path from the light source to the scanned surface is unfolded so as to be straight and will be referred to as a folded sub-scanning direction. The two beams are converged in the neighborhood of a deflecting and reflecting surface 41 of a polygon mirror 40 provided as a beam deflector.

As the polygon mirror 40 is rotated in the direction indicated by the arrow at a constant velocity, the two beams reflected by the deflecting and reflecting surface 41 are converged by an fθ lens 32 (a scanning image-forming optic) onto a scanned surface 50 so as to form two beam spots for scanning the scanned surface 50. Since a photosensitive body having a photo-conductive characteristic is usually provided on the scanned surface 50, the beam spots substantially scan the photosensitive body.

The light source 10 comprises a casing 18, two semiconductor lasers 11 and 12, two collimating lenses 13 and 14, a half-wave plate 15 for rotating the plane of polarization of the light beams from the semiconductor laser 11, a beam combination prism 16 for combining the light beams from the semiconductor lasers 11 and 12, and a quarter-wave plate 17 for transforming the combined light beams into circularly polarized beams.

The beams emitted by the semiconductor lasers 11 and 12 enter the beam combination prism 16 after being transformed into parallel beams by the collimating lenses 13 and 14, respectively. The light beam from the semiconductor laser 11 passes through a polarizing beam splitter film 162 in the beam combination prism 16 before exiting the beam combination prism 16. The light beam from the semiconductor laser 12 is reflected toward the interior by a slope 161 of the beam combination prism 16 and is reflected by the polarizing film splitter film 162 before exiting the beam combination prism 16.

Referring to FIG. 1A, the collimating lenses 13 and 14 are provided on a plane parallel with a direction that corresponds to the main-scanning direction. The direction with which the plane is parallel matches the main-scanning direction when the optical path from the light source to the scanned surface is unfolded so as to be straight and will be referred to as a folded main-scanning direction. At least one of the semiconductor lasers 11 and 12 is displaced from the optical axis of the corresponding collimating lens by a small distance in the folded main-scanning direction or in the folded sub-scanning direction. In FIG. 1A, displacement of the semiconductor laser 12 from the optical axis of the collimating lens 14 in the folded sub-scanning direction is exaggerated. A line connecting light-emitting parts of the semiconductor lasers 11 and 12 forms a small angle $\theta_A$ with respect to the folded main-scanning direction. Due to the angle $\theta_A$, the two beams exiting the beam combination prism 16 are displaced in the folded sub-scanning direction by a small angle. This small angle determines a separation $P_S$ in the sub-scanning direction between the two beam spots converged onto the scanned surface 50.

The displacement, if any, in the folded main-scanning direction, of the semiconductor laser 11 from the optical axis of the collimating lens 13 is made to slightly differ from the displacement, if any, in the folded main-scanning direction, of the semiconductor laser 12 from the optical axis of the collimating lens 14. Therefore, the beams exiting the beam combination prism 16 form a small angle $\theta_B$ in the folded main-scanning direction. A separation $P_M$ in the main-scanning direction between two beam spots converged onto the scanned surface 50 is determined by the angle $\theta_B$.

Referring to FIG. 1A, by rotating the light source 10 around the optical axis of the collimating lens 13, the line connecting the two beam spots on the scanned surface 50 is rotated while the distance between the two beam spots is maintained constant. In this way, the separations $P_M$ and $P_S$ can be controlled.

The planes of linear polarization of the two beams exiting the beam combination prism 16 are at right angles to each other. Shading is likely to occur if no corrective measures are taken. By causing the two beams to pass through the quarter-wave plate 17, the two beams are transformed into beams circularly polarized in the opposite directions. The combined, shading-corrected beams exit the light source 10.

Before scanning the photosensitive body, the beams exiting the light source 10 and deflected by the polygon mirror 40 are incident on a mirror 61 via the fθ lens 32. The beams are reflected by the mirror 61 and incident on a photosensitive element 64 via a quarter-wave plate 62 and a polarizer 63. The photosensitive element 64 is provided on the optical path that includes the mirror 61 so as to be an equivalent of the scanned surface 50 in that two beam spots are formed on the photosensitive element 54 exactly as they are on the scanned surface 50 (the equivalence is not accurately illustrated in FIG. 1A). The θ lens 32 embodies the converging means as claimed for converging the two beams onto the photosensitive element 64.

The two beams reflected by the mirror 61 and incident on the quarter-wave plate 62 are circularly polarized in the opposite directions. By passing through the quarter-wave plate 62, the two beams are transformed into linearly polarized beams having the planes of polarization thereof at right angles to each other. The two linearly polarized beams pass through the polarizer 63.

As shown in FIG. 1B, the direction in which the polarizer 63 provides the maximum transmittance to the linearly polarized beams is inclined with respect to the direction of polarization of a beam B1 (the light beam from the semiconductor laser 11) by an angle θ. The ratio between the light intensity of a beam B2 (the beam from the semiconductor laser 12) and that of the beam B1 is $\cos^2\theta$ : $\sin^2\theta$ after the beams B1 and B2 pass through the polarizer 63. The angle θ determines a difference between the light intensity of the beam B1 and that of the beam B2 on a photoreception surface 64A of the photosensitive element 64. In the case of FIG. 1B, the light intensity of the beam B1 is higher than that of the beam B2.

The quarter-wave plate 62 and the polarizer 63 constitute the light-intensity differentiating means as claimed.

Thus, the deflected two beams which differ in light intensity are converged onto the photosensitive element 64 before the start of scanning.

The photoreception surface 64A of the photosensitive element 64 has a right-angle triangle configuration as shown in FIG. 1C. One of the two sides (horizontal side in FIG. 1C) forming the right angle is parallel to the direction in which the photoreception surface 64A is scanned by the beams B1 and B2 and the other side is parallel to the direction perpendicular to the direction in which the photoreception surface 64A is scanned.

That is, the photosensitive element 64 has a configuration in which the width of the photoreception surface 64A in the scanning direction thereof increases toward the bottom of the photosensitive element 64, that is, in the direction perpendicular to the scanning direction on the photoreception surface 64A. With this arrangement, the beams B1 and B2 differ in time required to pass the photoreception surface 64A in the scanning direction thereof.

In FIG. 1C, symbols SP1 and SP2 indicate beam spots created by converging the beams B1 and B2, respectively.

When the beams B1 and B2 pass through the photoreception surface 64A, the photosensitive element 64 generates a photoreception signal. The photoreception signal is transformed into a rectangular signal and subject to a necessary operation by a signal-generating and operating means 65 provided in a controlling means 80 for controlling the operation of the two-beam scanning apparatus. The controlling means 80 also includes a light-source controlling means 81 for controlling the light intensity of the beams from the semiconductor lasers 11 and 12 when necessary. The signal-generating and operating means 65 embodies the signal generating means and the operating means as claimed. For example, the signal-generating and operating means 65 is implemented by a microcomputer. The signal supplied from the photosensitive element 64 to the signal-generating and operating means 65 is transformed into a digital signal. Subsequently, the digital signal is transformed into a rectangular signal using two or three threshold levels.

A description will now be given of a case where the beam spots SP1 and SP2 formed by the beams B1 and B2, respectively, are spaced apart in the main-scanning direction (i.e. the separation $P_N$ shown in FIG. 1A is relatively large).

The light intensity of the beam spot SP1 from the beam B1 is controlled to be higher than that of the beam spot SP2, as shown in FIG. 1B. Since the beam B1 takes less time to travel across the photoreception surface 64A than the beam B2, the signal generated by the photosensitive element 64 is such as shown in FIG. 2A. As shown in FIG. 2B, the signal-generating and operating means 65 produces a rectangular signal T1 obtained using a low threshold level TH1 and a rectangular signal T2 obtained using a high threshold level TH2. The signal T2 is derived only from the beam B1 having the higher light intensity so that the signal T2 is designated as a detection signal Beam 1 corresponding to the beam B1 (see FIG. 2C).

The signal-generating and operating means 65 inverts the signal T2 so as to obtain the signal T2' and then multiplies the signal T2' with the signal T1. The product signal T1·T2' (see FIG. 2C) corresponds only to the beam B2 having the lower light intensity so that the signal T1·T2' is designated as a detection signal Beam 2 corresponding to the beam B2.

Synchronization of the two beams B1 and B2 at the start of scanning is controlled using a rising edge of the detection signal Beam 1 for the beam B1 and a rising edge of the detection signal Beam 2 for the beam B2.

The velocity v with which the beams B1 and B2 travel across the photoreception surface 64A of the photosensitive element 64 is determined solely by the rotating speed of the polygon mirror 40.

Given that the detection signal Beam 1 lasts for a period of time t1 and the detection signal Beam 2 a period of time t2, and the angle formed by the hypertenuse and the bottom side is indicated by α, as shown in FIG. 1C, $v \cdot (t_2-t_1) \tan \alpha$ gives a distance, in the sub-scanning direction, between the beam spots SP1 and SP2 and is equal to the separation $P_S$ shown in FIG. 1A. Accordingly, by providing the signal-generating and operating means 65 with a time calculating facility for calculating time t1 and t2 and a calculating facility for performing the calculation $v \cdot (t_2-t_1) \tan \alpha$, it is possible to measure the separation $P_S$ between the two beam spots SP1 and SP2 in the sub-scanning direction.

When the distance between the two beam spots SP1 and SP2 in the main-scanning direction (the separation $P_M$ shown in FIG. 1A) is small, it is impossible to obtain the detection signal for individual beams according to the above-described method. In this case, the output of the photosensitive element 64 is transformed into rectangular signals using three threshold levels.

Processing of the output of the photosensitive element 64 using three threshold levels will be described with reference to FIGS. 4A, 4B and 4C. The three threshold levels are indicated by TH1, TH2 and TH3 in FIG. 4A. Rectangular signals obtained by using the threshold levels TH1, TH2 and TH3 are indicated by T1, T2 and T3, respectively, in FIG. 4B. FIG. 4B also shows an inverted signal T2' derived from the signal T2.

The signal T2 corresponds only to the beam B1 having the higher light intensity. Therefore, the signal T2 is designated as the detection signal for the beam B1 (FIG. 4C).

As shown in FIG. 4C, an operation T1·T2' + T3 results in a signal which corresponds only to the beam B2 having the lower light intensity. Therefore, the signal T1·T2+T3' is designated as the detection signal for the Beam B2. The operation T1·T2'+T3 is executed by the signal-generating and operating means 65.

Thus, the beams B1 and B2 can be detected individually in any of four cases: a case where the beam spot SP2 slightly precedes the beam spot SP1 (see (4-1) of FIGS. 4A through 4C); a case where the beam spots SP1 and SP2 are aligned in the direction perpendicular to the scanning direction (see (4-2) of FIGS. 4A through 4C); a case where the beam spot SP1 slightly precedes the beam spot SP1 (see (4-2) of FIGS. 4A through 4C); and a case where the beam spots SP1 and SP2 are clearly separated in the scanning direction (see (4-4) of FIGS. 4A through 4C).

In the first embodiment show in FIG. 1A, the quarter-wave plate 17 is not necessary if shading correction is not required. In this case, the quarter-wave plate 62 is also unnecessary. Detection signals for the respective beams can be obtained such that the polarizer 63 provides difference in light intensity of the beams B1 and B2 in the same manner as described above.

One conceivable variation of the first embodiment of FIG. 1A is such that the quarter-wave plate 62 is used to transform the two incident beams into linearly polarized beams having the planes of polarization thereof at right angles to each other, whereupon the two linearly-polarized beams are caused to pass through the respective photosensitive elements. Such photosensitive elements could be successively arranged in the scanning direction and provided with a polarizer. The directions of polarization of the polarizers provided on the respective photosensitive elements could be at right angles to each other.

Figure 5:
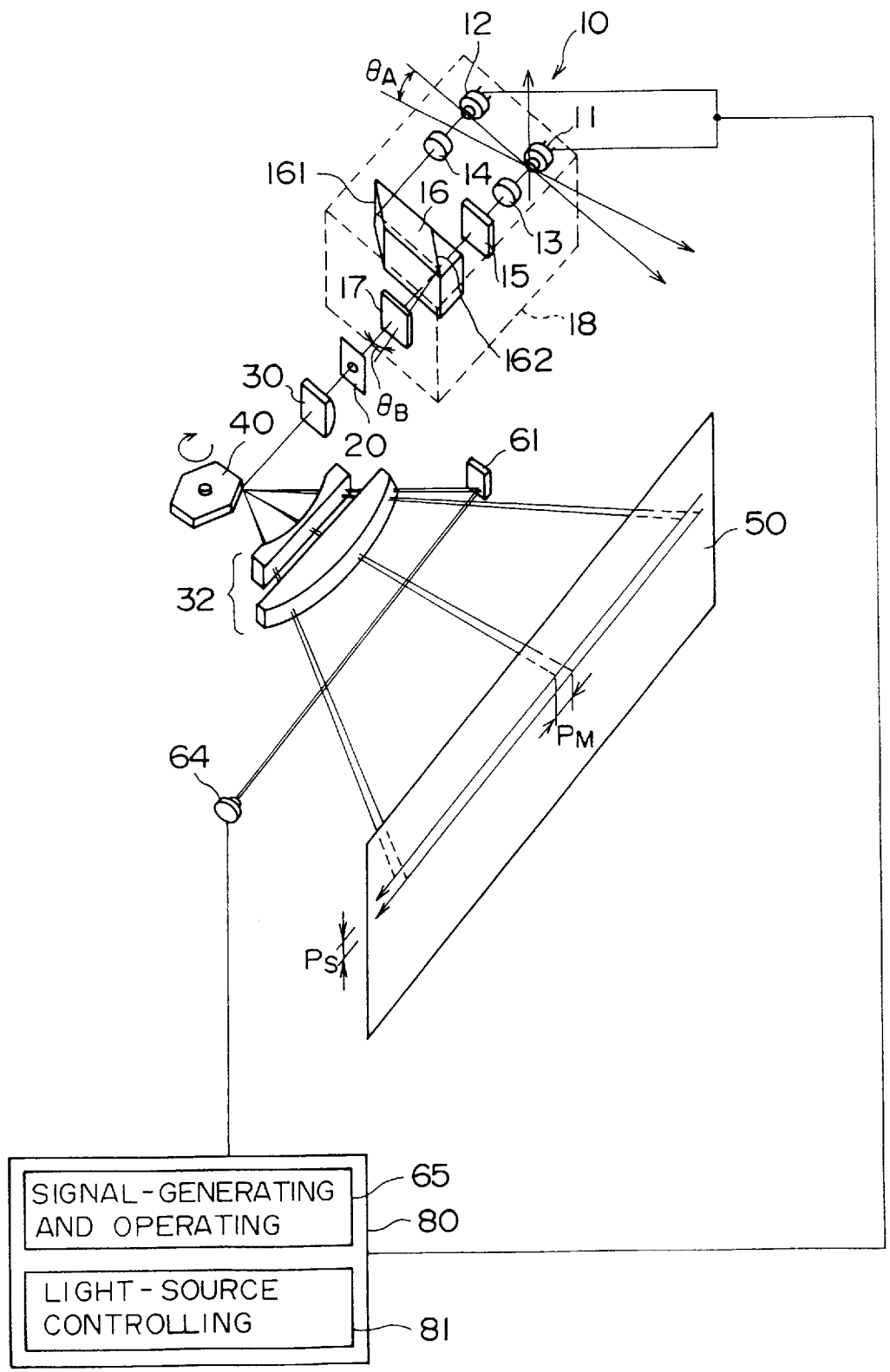
FIG. 5 shows a two-beam scanning apparatus according to a second embodiment of the present invention.

FIG. 5 shows a two-beam scanning apparatus according to a second embodiment of the present invention. In FIG. 5, those elements that are identical to the corresponding elements of FIG. 1A are designated by the same reference numerals, and the description thereof is omitted. The photoreception surface 64A of the photosensitive element 64 has the configuration as shown in FIG. 1C.

When the individual beams B1 and B2 directed to the scanned surface are to be detected according to the second embodiment, the light-source controlling means 81 controls the semiconductor lasers 11 and 12 such that the beams B1 and B2 differ in light intensity.

When the light intensity of the beam emitted by the semiconductor laser 11 is configured to be higher than that of the beam emitted by the semiconductor laser 12, the detection signals Beam 1 and Beam 2 corresponding to the beams B1 and B2, respectively, can be obtained in the same manner as described with reference to FIGS. 2A, 2B, 2C, 3, 4A, 4B and 4C.

The operation $v \cdot (t_2-t_1) \tan \alpha$ gives a separation $P_S$ between the two beam spots in the direction perpendicular to the scanning direction.

The quarter-wave plate 62 and the polarizer 63 are not provided in the apparatus of FIG. 5. Thus, the second embodiment has an advantage over the first embodiment in that the cost is reduced.

The photoreception surface 64A of the photosensitive element 64 may be configured such that the beams enter the photosensitive element 64 at the hypotenuse of the triangle defining the photoreception surface 64A. Alternatively, the photosensitive element 64 may be inverted. The photoreception surface 64A may have other configurations including a configuration of an isosceles triangle with the symmetrical axis thereof aligned with the direction perpendicular to the scanning direction of the photosensitive element 64.

Figure 6:
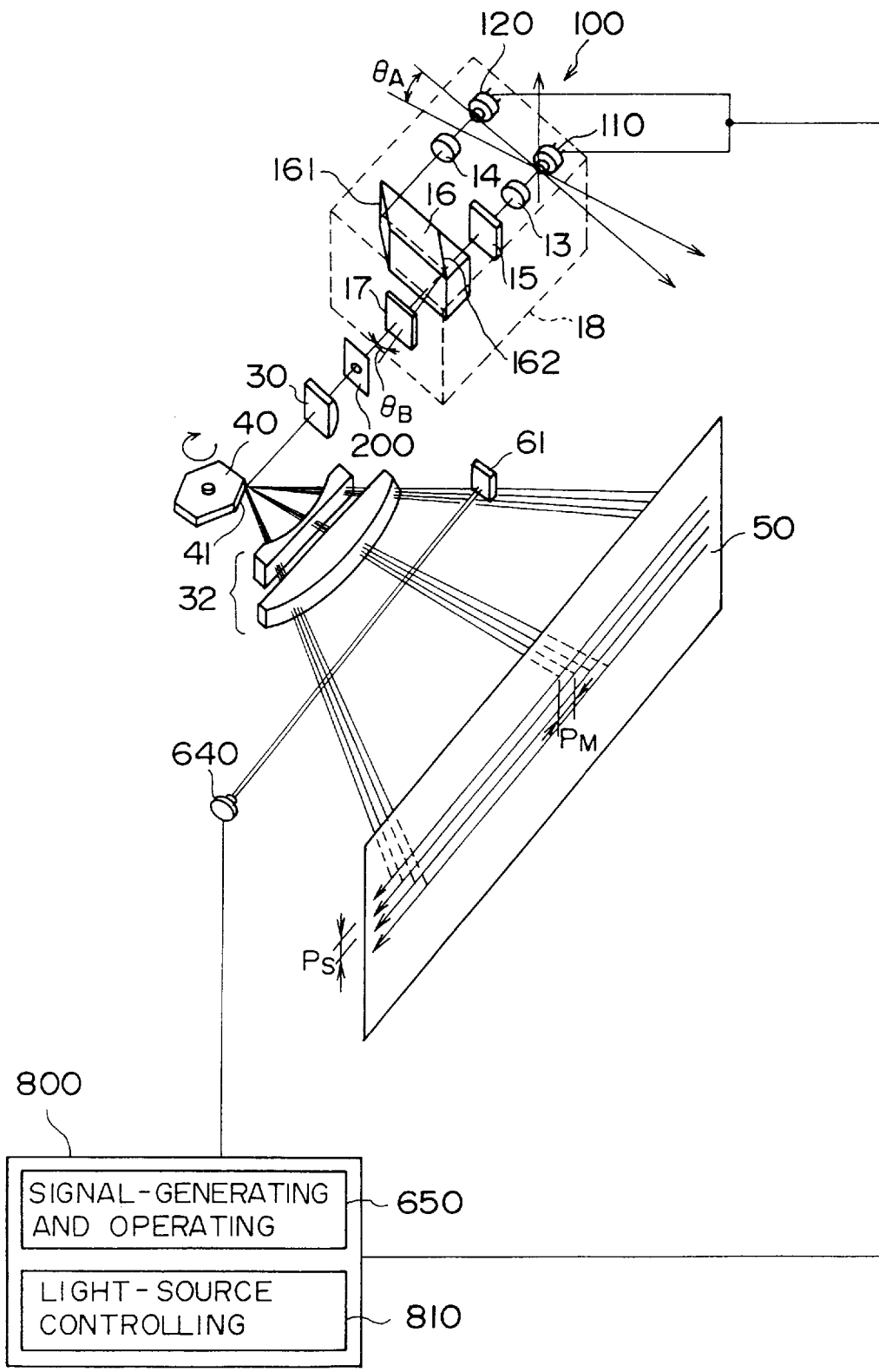
FIG. 6 shows a four-beam scanning apparatus according to the second embodiment.

The arrangement as used in the second embodiment may also be applied to multi-beam scanning apparatuses other than a two-beam scanning apparatus. For example, FIG. 6 shows a four-beam scanning apparatus according to the second embodiment. In FIG. 6, those elements that are the same as the corresponding elements of FIGS. 1A and 5 are designated by the same numerals, and the description thereof is omitted.

The light source 100 is constructed similarly to the light source 10 and comprises semiconductor laser arrays 110 and 120. Each of the semiconductor laser arrays 110 and 120 has two light-emitting parts on a monolithic base so that the semiconductor laser array 110 emits beams B1 and B2 and the semiconductor laser array 120 emits beams B3 and B4.

The light-emitting parts in the semiconductor laser array 110 are arranged in parallel with the light-emitting parts in the semiconductor laser array 120 so that the light source 100 emits four substantially parallel beams with a separation angle of $\theta_B$ from each other. In FIG. 6, only two beams are shown to exit from the quarter-wave plate 17 for the sake of simplicity of illustration.

The four beams B1, B2, B3 and B4 exiting the beam combination prism 16 are transformed into circularly-polarized beams by the quarter-wave plate 17 before being emitted from the light source 100. The beams exiting the light source 100 pass through an aperture of an aperture plate 200 provided for beam spot shaping before entering the cylinder lens 30. The cylinder lens 30 converges the beams only in the folded sub-scanning direction so that the beams are converged in the neighborhood of the deflecting and reflecting surface 41 of the polygon mirror 40 provided as a common beam deflector. As the polygon mirror 40 is rotated in the direction indicated by the arrow at a constant velocity, the two beams reflected by the deflecting and reflecting surface 41 are converged by the fθ lens 32 (a common scanning image-forming optic) onto the scanned surface 50 so as to form four beam spots for scanning the scanned surface 50. Since a photosensitive body having a photoconductive characteristic is usually provided on the scanned surface 50, the beam spots substantially scan the photosensitive body.

The angles $\theta_A$ and $\theta_B$ and the relative position of the semiconductor laser arrays 110 and 120 with respect to the respective collimating lenses 13 and 14, respectively, determine the separation $P_M$ between adjacent beam spots of the four beam spots on the scanned surface 50 in the main-scanning direction and the separation $P_S$ between adjacent beam spots in the sub-scanning direction. By rotating the light source 100 around the optical axis of the collimating lens 13 appropriately, the separations $P_M$ and $P_S$ can be adjusted.

The four-beam scanning apparatus as shown in FIG. 6 is provided with a common photosensitive element 640 for receiving the four beams B1 through B4 before they travel to the scanned surface via the fθ lens 32 and is also provided with the mirror 61 for reflecting the four beams B1 through B4 to the photosensitive element 640. The four beams B1 through B4 are converged by the fθ lens 32 in the neighborhood of a photoreception surface 640A of the photosensitive element 640.

Referring to FIG. 6, a controlling means 800 includes a signal-generating and operating means 650 and a light-source controlling means (light-intensity differentiating means as claimed) 810. Multi-beam detection is effected such that the beams emitted by the four light-emitting parts differ in light intensity so that the four beams B1 through B4 entering the photosensitive element 640 differ in light intensity.

Figure 7A:
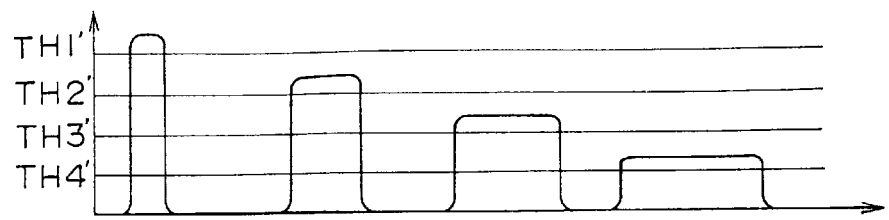
FIGS. 7A through 7C show how detection signals are obtained for four beams.
Figure 7B:
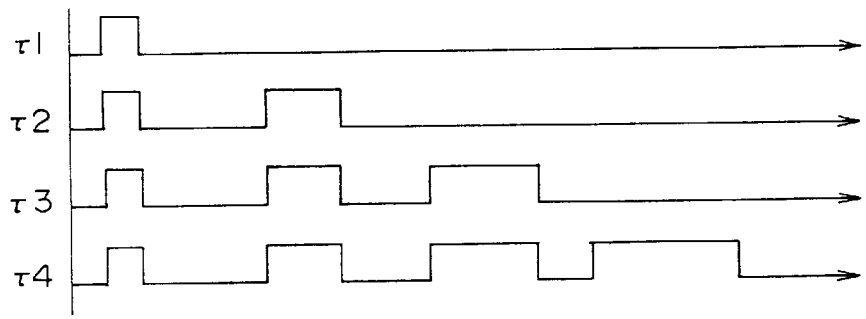
Figure 7C:
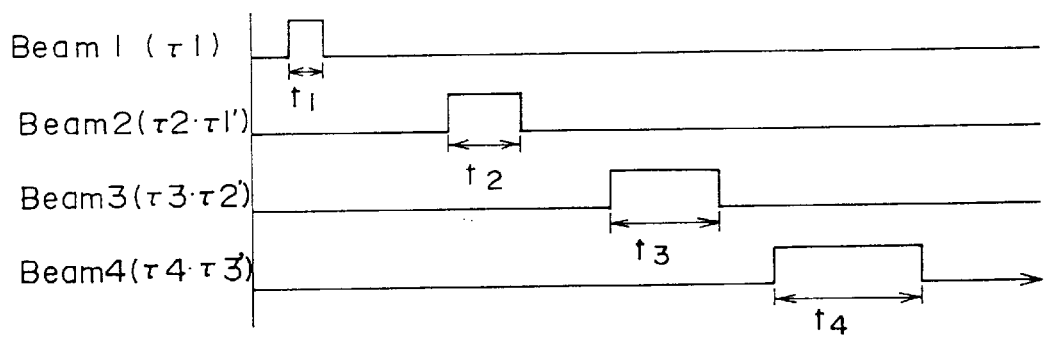
Figure 7D:
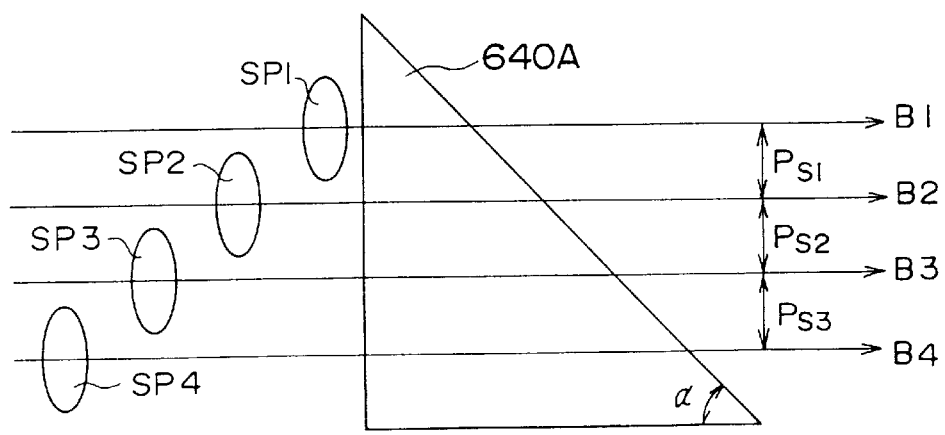
FIG. 7D shows a configuration of a photoreception surface of a photosensitive element receiving four beams.

FIG. 7D shows a configuration of the photoreception surface 640A of the photosensitive element 640 receiving the four beams B1 through B4. As shown in FIG. 7D, beam spots SP1 through SP4 derived from the four beams B1 through B4, respectively successively cross the photoreception surface 640A. In FIG. 7D, intervals between the beam spots SP1 through SP4 in the horizontal direction in the figure are shown to be relatively small. In actuality, however, the intervals are much larger in proportion than illustrated. The photoreception surface 640A receives one beam spot at a time.

Since the beams B1 through B4 differ from each other in light intensity and the width of photoreception surface 640A in the scanning direction thereof (horizontal direction in the illustration) increases toward the bottom of the photosensitive element 640, that is, in the direction perpendicular to the scanning direction of the photoreception surface 640A, the photosensitive element 640 outputs a signal as shown in FIG. 7A.

Using four threshold levels TH1'–TH4', the signal-generating and operating means 650 turns the signal shown in FIG. 7A into rectangular signals τ1 through τ4 as shown in FIG. 7B. The signal-generating and operating means 650 may be implemented by a microcomputer.

The signal-generating and operating means 650 produces inverted signals τ1', τ2' and τ3' for the rectangular signals τ1, τ2 and τ3, respectively. The signal-generating and operating means 650 also performs operations τ2·τ1', τ3·τ2', τ4·τ3'. The operation results are shown in FIG. 7C together with the rectangular signal τ1.

The operations τ2·τ1', τ3·τ2', τ4·τ3' give rectangular signals that are separate from each other and are also separate from the rectangular signal τ1. The rectangular signals τ1, τ2·τ1', τ3·τ2' and τ4·τ3' correspond to the beam spots SP1 through SP4, respectively, and can therefore be used as detection signals Beam 1 through Beam 4 for the beams B1 through B4, respectively.

The signal-generating and operating means 650 as shown in FIG. 6 also calculates the separation between adjacent beam spots of the beam spots SP1 through SP4 in the sub-scanning direction. More specifically, separation $P_{S1}$ between the beam spots SP1 and SP2, separation $P_{S2}$ between the beam spots SP2 and SP3 and separation $P_{S3}$ between the beam spots SP3 and SP4 are calculated as per $$P_{S1} = v \cdot (t_2 - t_1) \cdot \tan \alpha$$

$$P_{S2} = v \cdot (t_3 - t_2) \cdot \tan \alpha$$

$$P_{S3} = v \cdot (t_4 - t_3) \cdot \tan \alpha$$

where v indicates a speed at which the beam spots SP1 through SP4 derived from the beams B1 through B4, respectively, pass the photoreception surface 640A, $t_1$ through $t_4$ indicate a period of time required for the beam spots SP1 through SP4, respectively, to pass the photoreception surface 640A, and α indicates an angle formed by the hypertenuse and the bottom side of the triangle defining the photoreception surface 640A.

If one of the semiconductor laser arrays 110 and 120 is replaced by an ordinary semiconductor laser having only one emitting part, a scanning apparatus for scanning the scanned surface with three beams results. If both of the semiconductor laser arrays 110 and 120 are respectively provided with more than two light-emitting parts, a scanning apparatus for scanning the scanned surface with more than four scan lines results. Multi-beam detection and calculation of a sagittal beam separation according to the second embodiment can be performed in any one of these cases described above.

Figure 8:
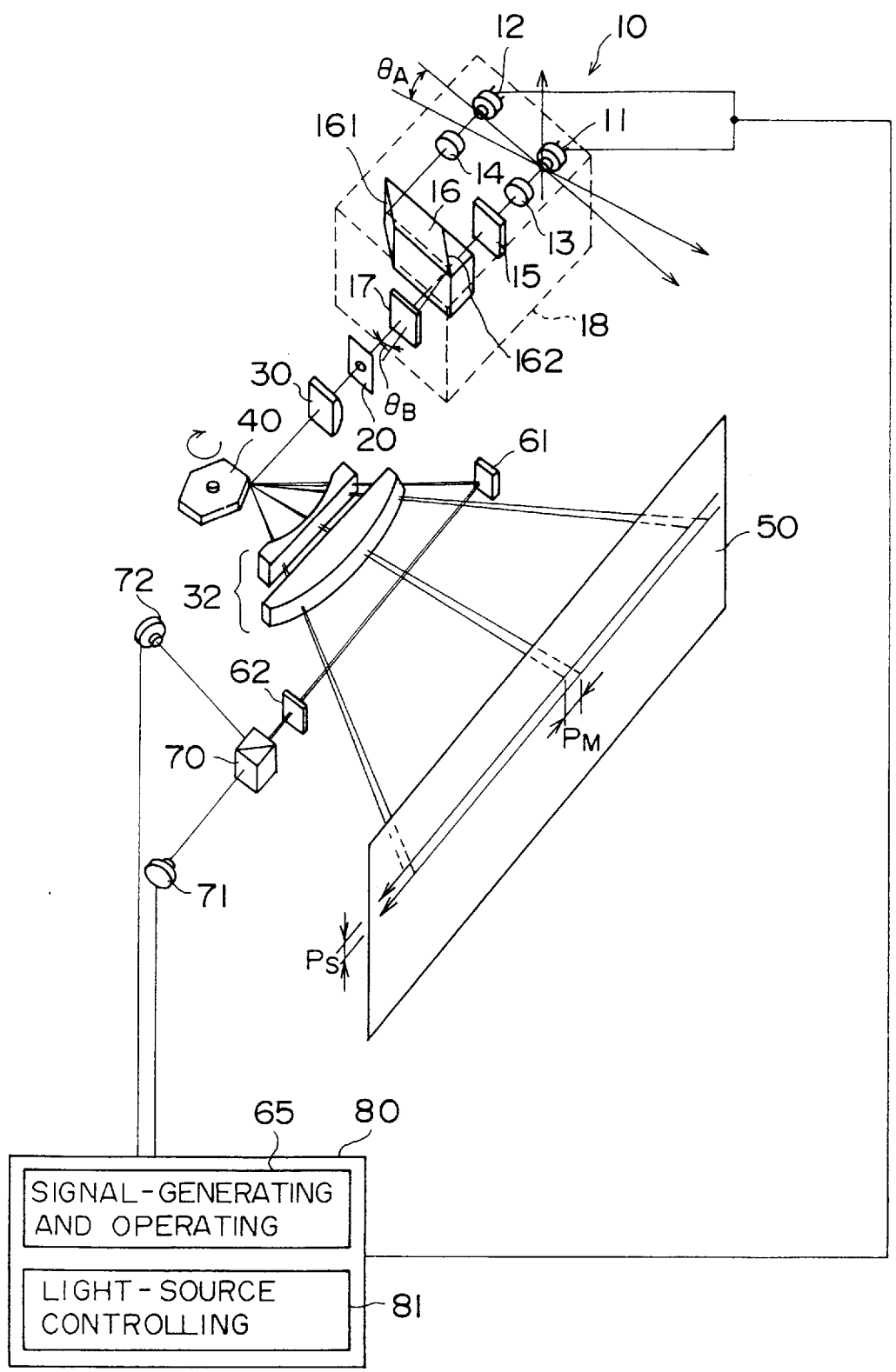
FIG. 8 shows a two-beam scanning apparatus according to a third embodiment of the present invention.

FIG. 8 shows a two-beam scanning apparatus according to a third embodiment of the present invention. In FIG. 8, those elements that are identical to the corresponding elements of FIG. 1A are designated by the same reference numerals, and the description thereof is omitted.

The two-beam scanning apparatus according to the third embodiment differs from that of the first embodiment in that the two beams passing through the quarter-wave plate 62 enter a polarizing beam splitter 70. As described with reference to FIG. 1B, the two beams are transformed by the quarter-wave plate 62 into linearly-polarized beams having the planes of polarization thereof at right angles to each other. The beam B1 from the semiconductor laser 11 passes through the polarizing beam splitter 70 so as to be converged onto a photosensitive element 71. The output of the photosensitive element 71 gives the detection signal for the beam B1.

The beam B2 from the semiconductor laser 12 is separated from the beam B1 by being reflected by the polarizing beam splitter 70 so as to enter a photosensitive element 72. The output of the photosensitive element 72 gives the detection signal for the beam B2.

Figure 9A:
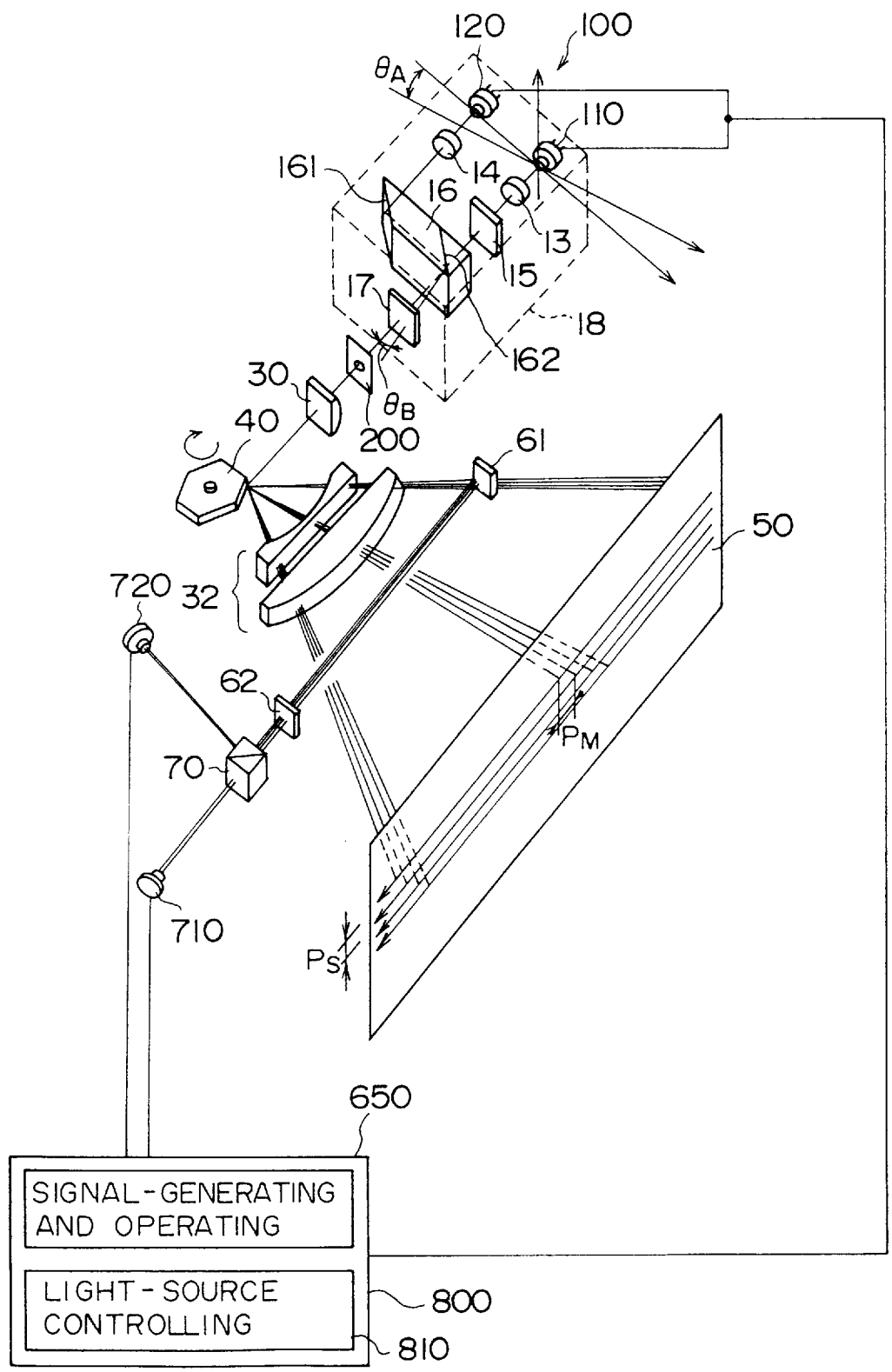
FIG. 9A shows a four-beam scanning apparatus to which the first through third embodiments are applied in combination.

The arrangement of the above-described embodiments can be applied in combination to any multi-beam scanning apparatus. FIG. 9A shows a four-beam scanning apparatus to which the above-described embodiments are applied in combination. In FIG. 9A, those elements that are identical to the corresponding elements of FIG. 1A, FIG. 6 and FIG. 8 are designated by the same reference numerals, and the description thereof is omitted.

The four beams passing through the quarter-wave plate 62 enter the polarizing beam splitter 70. The four beams are transformed by the quarter-wave plate 62 into linearly-polarized beams having the planes of polarization thereof at right angles to each other. The beams B1 and B2 from the semiconductor laser array 110 pass through the polarizing beam splitter 70 so as to be converged onto a photosensitive element 710. The beams B3 and B4 from the semiconductor laser array 120 are separated from the beams B1 and B2 by being reflected by the polarizing beam splitter 70 so as to enter a photosensitive element 720.

The scanning apparatus of FIG. 9A operates such that the beams B1 through B4 from the semiconductor laser arrays 110 and 120 are transformed by the quarter-wave plate 17 into circularly polarized beams. More specifically, the beams B1 and B2 from the semiconductor laser array 110 are circularly polarized in the opposite direction with respect to the beams B3 and B4 from the semiconductor laser array 120. The beams B1 through B4 are deflected by the deflecting and reflecting surface of the common polygon mirror 40. The deflected beams are converged by the fθ lens 32 to form four beam spots for scanning the scanned surface 50 simultaneously.

Before the start of scanning, the beams directed to the scanned surface are transmitted through the common quarter-wave plate 62 and are separated into two sets of beams by the polarizing beam splitter 70. The beams B1 and B2 from the semiconductor laser array 110 are converged onto the photosensitive element 710. The beams B3 and B4 from the semiconductor laser array 120 are converged onto the photosensitive element 720.

In multi-beam detection, the light-source controlling means 810 included in the controlling means 800 causes the beams from the four light-emitting parts to differ from each other in light intensity.

Figure 9B:
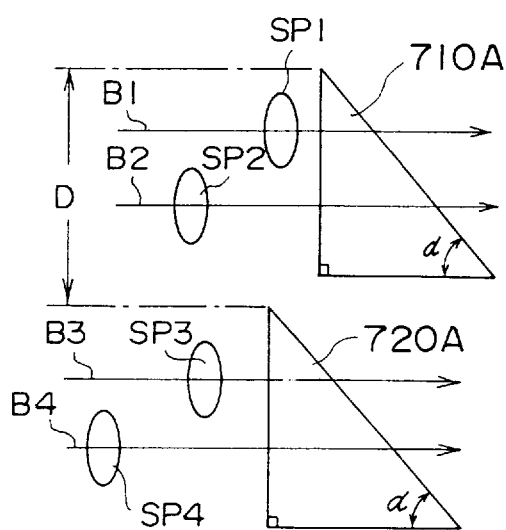
FIG. 9B shows a configuration of a photoreception surface of two photosensitive elements each receiving two beams.

Photoreception surfaces 710A and 720A of the photosensitive elements 710 and 720, respectively, have a right-angle triangle configuration as shown in FIG. 9B. Angle α is formed by the hypertenuse and the bottom side. The beam spots SP1 and SP2 derived from the beams B1 and B2 pass (scan) the photoreception surface 710A and the beam spots SP3 and SP4 derived from the beams B3 and B4 pass (scan) the photoreception surface 720A in the respective directions indicated by the arrows.

Given that the beam spots SP1 and SP2 are sufficiently separated from each other and the beam spots SP3 and SP4 are sufficiently separated from each other in the scanning direction of the photoreception surfaces 710A and 720A, respectively, so that the photoreception surfaces 710A and 720A each receives one beam spot at a time, outputs of the photosensitive elements 710 and 720 are processed by the signal-generating and operating means 650 in the manner as described with reference to FIG. 2A through 2C. In this way, individual detection signals for the beams B1 through B4 can be obtained.

Given that the beam spots SP1 and SP2 are relatively close to each other and the beam spots SP3 and SP4 are relatively close to each other in the scanning direction of the photoreception surfaces 710A and 720A, respectively, as shown in FIG. 3, the outputs of the photosensitive elements 710 and 720 are processed by the signal-generating and operating means 650 in the manner as described with reference to FIGS. 4A through 4C. In this way, individual detection signals for the beams B1 through B4 can be obtained.

The signal-generating and operating means 650 also calculates the separation between adjacent ones of the beam spots SP1 through SP4 in the sub-scanning direction. More specifically, separation $P_{S1}$ between the beam spots SP1 and SP2 and separation $P_{S3}$ between the beam spots SP3 and SP4 are calculated as per $$P_{S1} = v \cdot (t_2 - t_1)' \tan \alpha$$

$$P_{S3} = v \cdot (t_4 - t_3)' \tan \alpha$$

where v indicates a speed at which the beam spots SP1 and SP2 derived from the beams B1 and B2, respectively, pass the photoreception surface 710A and at which the beam spots SP3 and SP4 derived from the beams B3 and B4, respectively, pass the photoreception surface 720A, $t_1$ and $t_2$ indicate a period of time required for the beam spots SP1 and SP2 to pass the photoreception surface 710A, respectively, $t_3$ and $t_4$ indicate a period of time required for the beam spots SP3 and SP4 to pass the photoreception surface 720A, respectively, and α indicates an angle formed by the hypertenuse and the bottom side of the triangle of the photoreception surfaces 710A and 720A. Using the sagittal distance D shown in FIG. 9B, separation $P_{S2}$ between the beam spots SP2 and SP3 is calculated as per $$P_{S2} = (D + v \cdot t_3 \cdot \tan \alpha) - v \cdot t_2 \cdot \tan \alpha$$
$$= D + (t_3 + t_2) \cdot v \cdot \tan \alpha$$

The present invention is not limited to the above described embodiments, and variations and modifications may be made without departing from the scope of the present invention.

What is claimed is:

1. A two-beam detection method for separating two beams directed to a scanned surface from each other and detecting the two beams independently, for use in a two-beam scanning apparatus in which light beams from two independent light sources are reflected by a deflecting and reflecting surface of a common beam deflector and the deflected light beams are converged by a common scanning image-forming optic to form two beam spots producing two scan lines for scanning the scanned surface simultaneously, said two-beam detection method comprising the steps of:

causing the two beams to differ in light intensity and converging the two beams to enter a common photosensitive element, a photoreception surface of said photosensitive element being configured such that the two beams differ in time required to pass the photoreception surface;

processing an output from said photosensitive element using a plurality of threshold levels so as to obtain rectangular signals, one of the rectangular signals obtained using one of said plurality of threshold levels being designated as a detection signal for one of the two beams; and performing a predetermined calculation on the rectangular signals so as to obtain a detection signal for the other of the two beams.

2. The two-beam detection method as claimed in claim 1, wherein the two beams directed to the scanned surface are made to differ in light intensity by varying intensity of the light beams emitted by the two independent light sources.

3. The two-beam detection method as claimed in claim 1, wherein each of the two independent light sources is embodied by a semiconductor laser, said two-beam detection method further comprising:
transforming the light beams from the semiconductor lasers into beams circularly polarized in opposite directions, using a first quarter-wave plate; and
transforming the two beams directed to the scanned surface into linearly-polarized beams having planes of polarization thereof at right angles to each other, using a second quarter-wave plate; and
causing the two beams to differ in light intensity by transmitting the two beams through a common polarizer.

4. The two-beam detection method as claimed in claim 1, further comprising the steps of:
processing the output of said common photosensitive element using two threshold levels so as to obtain rectangular signals;
designating a signal T2 as a detection signal for one of the two beams; and
giving a detection signal for the other of the two beams by an operation T1·T2', wherein
T1 indicates a rectangular signal obtained using a lower threshold level, T2 indicates a signal obtained using a higher threshold level and T2' indicates an inverted signal for the signal T2.

5. The two-beam detection method as claimed in claim 1, further comprising the steps of:
processing the output of said common photosensitive element using three threshold levels so as to obtain rectangular signal;
designating a signal T2 as a detection signal for one of the two beams; and
giving a detection signal for the other of the two beams by an operation T1+T2'+T3, wherein
T1 indicates a rectangular signal obtained using a lower threshold level, T2 indicates a rectangular signal obtained using an intermediate threshold level, T2' indicates an inverted signal for the signal T2 and T3 indicates a rectangular signal obtained using a higher threshold level.

6. A two-beam detection method for separating two beams directed to a scanned surface from each other and detecting the two beams independently, for use in a two-beam scanning apparatus in which light beams from two independent semiconductor lasers are transformed by a first common quarter-wave plate into beams circularly polarized in opposite directions and are reflected by a deflecting and reflecting surface of a common beam deflector and the deflected light beams are converged by a common scanning image-forming optic to form two beam spots producing two scan lines for scanning the scanned surface simultaneously, said two-beam detection method comprising the steps of:
causing the two beams directed to the scanned surface to enter a polarizing beam splitter via a second common quarter-wave plate so as to separate the two beams from each other; and
causing the separated beams to enter respective photosensitive elements so as to generate a detection signal for each of the two beams.

7. A two-beam scanning apparatus for running two scan lines simultaneously on a scanned surface, by transforming two beams from two independent semiconductor lasers into beams circularly polarized in opposite directions by a first common quarter-wave plate, reflecting the circularly-polarized beams by a deflecting and reflecting surface of a beam deflector, and by converging the deflected beams by a common scanning image-forming optic to form two beam spots for scanning the scanned surface, said two-beam scanning apparatus comprising:

common photosensitive element means for receiving the two beams directed to the scanned surface;
converging means for converging the two beams on said common photosensitive element; and
controlling means for controlling an operation of the two-beam scanning apparatus;
said controlling means comprising:
light-intensity differentiating means for differentiating light intensity of the two beams incident on said common photosensitive element;
signal-generating means for processing an output of said common photosensitive element using a plurality of threshold levels so as to obtain rectangular signals; and
operating means for performing a predetermined operation on the rectangular signals obtained by said signal-generating means,
wherein
said common photosensitive element has a photoreception surface configured such that a width thereof in a scanning direction of said common photosensitive element increases in a direction perpendicular to said scanning direction.

8. The two-beam scanning apparatus as claimed in claim 7, wherein said light-intensity differentiating means is implemented by controlling the semiconductor lasers so that the light beams emitted by the two semiconductor lasers differ in light intensity.

9. The two-beam scanning apparatus as claimed in claim 7, wherein the light-intensity differentiating means is implemented by a second quarter-wave plate for transforming the beams into linearly-polarized beams having planes of polarization at right angles to each other and by a polarizer provided between the second quarter-wave plate and the photosensitive element so as to provide different transmittance to the beams.

10. The two-beam scanning apparatus as claimed in claim 7, wherein said operating means calculates a separation between the two beam spots in a direction perpendicular to a main-scanning direction, based on the rectangular signal obtained by said signal-generating means.

11. A two-beam scanning apparatus for running two scan lines simultaneously on a scanned surface, by transforming two beams from two independent semiconductor lasers into beams circularly polarized in opposite directions by a first common quarter-wave plate, reflecting the circularly-polarized beams by a deflecting and reflecting surface of a beam deflector, and by converging the deflected beams by a common scanning image-forming optic to form two beam spots for scanning the scanned surface, said two-beam scanning apparatus comprising:

a second common quarter-wave plate for transmitting the two beams directed to the scanned surface;

a polarizing beam splitter for separating the two beams transmitted by the second common quarter-wave plate; and two photosensitive elements for respectively receiving the two beams separated by said polarizing beam splitter so as to output detection signals respectively indicating detection of the two beams.

12. A two-beam scanning apparatus for running two scan lines simultaneously on a scanned surface, by transforming two beams from two independent semiconductor lasers into beams circularly polarized in opposite directions by a first common quarter-wave plate, reflecting the circularly-polarized beams by a deflecting and reflecting surface of a beam deflector, and by converging the deflected beams by a common scanning image-forming optic to form two beam spots for scanning the scanned surface, said two-beam scanning apparatus comprising:

a common photosensitive element for receiving the two beams directed to the scanned surface;

a converging unit for converging the two beams on said common photosensitive element; and a controlling unit for controlling an operation of the two-beam scanning apparatus;

said controlling unit comprising:
a light-intensity differentiating unit for differentiating light intensity of the two beams incident on said common photosensitive element;
a signal-generating unit for processing an output of said common photosensitive element using a plurality of threshold levels so as to obtain rectangular signals;
an operating unit for performing a predetermined operation on the rectangular signals obtained by said signal-generating unit,
wherein
said common photosensitive element has a photoreception surface configured such that a width thereof in a scanning direction of said common photosensitive element increases in a direction perpendicular to said scanning direction.

13. The two-beam scanning apparatus as claimed in claim 12, wherein said light-intensity differentiating unit is implemented by controlling the semiconductor lasers so that the light beams emitted by the two semiconductor lasers differ in light intensity.

14. The two-beam scanning apparatus as claimed in claim 12, wherein said light-intensity differentiating unit is implemented by a second quarter-wave plate for transforming the beams into linearly-polarized beams having planes of polarization at right angles to each other and by a polarizer provided between the second quarter-wave plate and the photosensitive element so as to provide different transmittance to the beams.

15. The two-beam scanning apparatus as claimed in claim 12, wherein said operating unit calculates a separation between the two beam spots in a direction perpendicular to a main-scanning direction, based on the rectangular signal obtained by said signal-generating unit.

16. A multi-beam detection method for separating a total of n ($\geq 2$) beams directed to a scanned surface from each other and detecting the n beams independently, for use in a multi-beam scanning apparatus in which light beams from a total of n ($\geq 2$) independent light sources are reflected by a deflecting and reflecting surface of a common beam deflector and the deflected light beams are converged by a common scanning image-forming optic to form n beam spots producing n scan lines for scanning the scanned surface simultaneously, said multi-beam detection method comprising the steps of:

causing the n beams to differ in light intensity and converging the n beams to enter a common photosensitive element, a photoreception surface of said photosensitive element being configured such that the n beams differ in time required to pass the photoreception surface;

processing an output from said photosensitive element using a plurality of threshold levels so as to obtain rectangular signals, one of the rectangular signals obtained using one of said plurality of threshold levels being designated as a detection signal for one of the n beams; and performing predetermined calculations on the rectangular signals so as to obtain detection signals for the other beams.

17. The multi-beam detection method as claimed in claim 16, wherein the n beams directed to the scanned surface is made to differ from each other in light intensity by varying intensity of the light beams emitted by the light sources.

18. The multi-beam detection method as claimed in claim 16, further comprising the steps of:

separating the n beam spots in a main-scanning direction so that said common photosensitive element receives one beam spot at a time;

processing the output of said common photosensitive element using two n threshold levels so as to obtain rectangular signals;

designating a signal $\tau 1$ as a detection signal for beam having the highest light intensity; and giving a detection signal for the beam having an ith highest light intensity by an operation $\tau i \cdot \tau j'$ (i=2−n, j=i−1), wherein
$\tau 1$ (i=1−n) indicates a rectangular signal obtained using an ith highest threshold level, and $\tau 1'$ indicates an inverted signal for the signal $\tau 1$.

19. The multi-beam detection method as claimed in claim 16, wherein the light sources are embodied by two independent semiconductor laser light sources wherein at least one of the semiconductor laser light sources is a semiconductor laser array.

20. A multi-beam detection method for separating a total of n ($\geq 3$) beams directed to a scanned surface from each other and detecting the n beams independently, for use in a multi-beam scanning apparatus in which n light beams from two independent semiconductor laser light sources are transformed by a common quarter-wave plate into two sets of beams circularly polarized in opposite directions, one of the two sets of beams being derived from one of the two independent light sources and the other of the two sets of beams being derived from the other of the two independent light sources, at least one of said two independent semiconductor laser light sources being embodied by a semiconductor laser array, and in which the circularly-polarized beams are reflected by a deflecting and reflecting surface of a common beam deflector and the deflected light beams are converged by a common scanning image-forming optic to form n beam spots producing n scan lines for scanning the scanned surface simultaneously, said multi-beam detection method comprising the steps of:

causing the n beams directed to the scanned surface to enter a polarizing beam splitter via a second common quarter-wave plate so as to separate the beams into two sets of beams each corresponding to one of the two independent semiconductor laser light sources;

causing the two separated sets of beams to enter respective photosensitive elements, a photoreception surface of the photosensitive element for receiving two or more beams being configured such that the beams differ from each other in time required to pass the photoreception surface;

processing an output from the photosensitive element for receiving two or more beams, using a plurality of threshold levels so as to obtain rectangular signals, one of the rectangular signals obtained using one of said plurality of threshold levels being designated as a detection signal for one of the n beams; and performing predetermined calculations on the rectangular signals so as to obtain detection signals for the other beams.

21. A multi-beam scanning apparatus for running n ($\geq 3$) scan lines simultaneously on a scanned surface, by reflecting n beams from two independent semiconductor laser light sources by a deflecting and reflecting surface of a common beam deflector, and by converging the deflected beams by a common scanning image-forming optic to form n beam spots for scanning the scanned surface, at least one of said two independent semiconductor laser light sources being embodied by a semiconductor laser array, said multi-beam scanning apparatus comprising:

common photosensitive element means for receiving the n beams directed to the scanned surface;

converging means for converging the n beams on said common photosensitive element; and controlling means for controlling an operation of the multi-beam scanning apparatus;

said controlling means comprising:

light-intensity differentiating means for differentiating light intensity of the n beams incident on said common photosensitive element;

signal-generating means for processing an output of said photosensitive element using a plurality of threshold levels so as to obtain rectangular signals; and operating means for performing predetermined operations on the rectangular signals obtained by said signal-generating means, wherein said common photosensitive element has a photoreception surface configured such that a width thereof in a scanning direction of said common photosensitive element increases in a direction perpendicular to said scanning direction.

22. A multi-beam scanning apparatus for running n ($\geq 3$) scan lines simultaneously on a scanned surface, by transforming, using a first common quarter-wave plate, n beams from two independent semiconductor laser light sources into two sets of beams circularly polarized in opposite directions, one of the two sets of beams being derived from one of the two independent light sources and the other of the two sets of beams being derived from the other of the two independent light sources, at least one of said two independent semiconductor laser light sources being embodied by a semiconductor laser array, by reflecting the circularly-polarized beams by a deflecting and reflecting surface of a common beam deflector, and by converging the deflected light beams by a common scanning image-forming optic to form n beam spots producing n scan lines for scanning the scanned surface simultaneously, said multi-beam scanning apparatus comprising:

a second common quarter-wave plate for transmitting the n beams directed to the scanned surface;

a polarizing beam splitter for separating the n beams transmitted by the second common quarter-wave plate into two sets of beams each corresponding to one of the two independent semiconductor laser light sources;

two photosensitive elements for receiving respective one of said two sets of separated beams so as to provide outputs used to generate detection signals; and controlling means for controlling an operation of the multi-beam scanning apparatus, said controlling means comprising:

light-intensity differentiating means for causing the beams emitted by the semiconductor laser light source for emitting two or more beams, to differ from each other in light intensity;

signal-generating means for processing the output of the photosensitive element for receiving two or more beams using a plurality of threshold levels so as to obtain rectangular signals; and operating means for performing predetermined operations on the rectangular signals obtained by said signal-generating means, wherein the photosensitive element for receiving two or more beams has a photoreception surface configured such that the incident beams differ in time required to pass the photoreception surface.

23. The multi-beam scanning apparatus as claimed in claim 21, wherein both of the two semiconductor laser light sources are embodied by a semiconductor laser array.

24. The multi-beam scanning apparatus as claimed in claim 21, wherein said light-intensity differentiating means is implemented by controlling the semiconductor laser light sources so that the light beams emitted by light-emitting parts of each of the semiconductor laser light sources differ in light intensity.

25. The two-beam scanning apparatus as claimed in claim 21, wherein said operating means calculates a separation between adjacent beam spots of said n beam spots in a direction perpendicular to a main-scanning direction, based on the rectangular signals obtained by said signal-generating unit.

26. A multi-beam scanning apparatus for running n ($\geq 3$) scan lines simultaneously on a scanned surface, by transforming, using a first common quarter-wave plate, n beams from two independent semiconductor laser light sources into two sets of beams circularly polarized in opposite directions, one of the two sets of beams being derived from one of the two independent light sources and the other of the two sets of beams being derived from the other of the two independent light sources, at least one of said two independent semiconductor laser light sources being embodied by a semiconductor laser array, by reflecting the circularly-polarized beams by a deflecting and reflecting surface of a common beam deflector, and by converging the deflected light beams by a common scanning image-forming optic to form n beam spots producing n scan lines for scanning the scanned surface simultaneously, said multi-beam scanning apparatus comprising:

a second common quarter-wave plate for transmitting the n beams directed to the scanned surface;

a polarizing beam splitter for separating the n beams transmitted by the second common quarter-wave plate into two sets of beams each corresponding to one of the two independent semiconductor laser light sources;

two photosensitive elements for receiving respective one of said two sets of separated beams so as to provide outputs used to generate detection signals; and a controlling unit for controlling an operation of the multi-beam scanning apparatus, said controlling unit comprising:
- a light-intensity differentiating unit for causing the beams emitted by the semiconductor laser light source for emitting two or more beams, to differ from each other in light intensity;
- a signal-generating unit for processing the output of the photosensitive element for receiving two or more beams using a plurality of threshold levels so as to obtain rectangular signals; and
- an operating unit for performing predetermined operations on the rectangular signals obtained by said signal-generating unit, wherein
the photosensitive element for receiving two or more beams has a photoreception surface configured such that the incident beams differ in time required to pass the photoreception surface.

27. The multi-beam scanning apparatus as claimed in claim 26, wherein both of the two semiconductor laser light sources are embodied by a semiconductor laser array.

28. The multi-beam scanning apparatus as claimed in claim 26, wherein said light-intensity differentiating unit is implemented by controlling the semiconductor laser light sources so that the light beams emitted by light-emitting parts of each of the semiconductor laser light sources differ in light intensity.

29. The two-beam scanning apparatus as claimed in claim 26, wherein said operating unit calculates a separation between adjacent beam spots of said n beam spots in a direction perpendicular to a main-scanning direction, based on the rectangular signals obtained by said signal-generating unit.

* * * * *